(12) United States Patent
Strathmeyer et al.

(10) Patent No.: US 7,123,712 B1
(45) Date of Patent: Oct. 17, 2006

(54) COMPUTER TELEPHONY SERVER WITH IMPROVED FLEXIBILITY

(75) Inventors: Carl Strathmeyer, Reading, MA (US); Donald Finnie, Reading (GB); Simon Jackson, Reading (GB)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/277,286

(22) Filed: Mar. 26, 1999

(51) Int. Cl.
*H04M 3/00* (2006.01)
*H04M 3/42* (2006.01)

(52) U.S. Cl. .................. 379/265.09; 379/201.02

(58) Field of Classification Search ........ 379/201–207, 379/225, 265, 90.01, 91.01, 93.01–93.11, 379/201.02, 207.13–207.15, 231, 265.02, 379/265.09
See application file for complete search history.

(56) References Cited

U.S. PATENT DOCUMENTS

| | | | | |
|---|---|---|---|---|
| 5,414,762 A | * | 5/1995 | Flisik et al. | 379/198 |
| 5,712,903 A | * | 1/1998 | Bartholomew et al. | 379/88.25 |
| 5,740,231 A | * | 4/1998 | Cohn et al. | 379/88.22 |
| 5,742,905 A | * | 4/1998 | Pepe et al. | 379/211.01 |
| 5,884,032 A | * | 3/1999 | Bateman et al. | 709/204 |
| 5,946,386 A | * | 8/1999 | Rogers et al. | 379/265.09 |
| 6,038,227 A | * | 3/2000 | Farris et al. | 370/354 |
| 6,058,435 A | * | 5/2000 | Sassin et al. | 719/331 |
| 6,069,947 A | * | 5/2000 | Evans et al. | 379/229 |
| 6,081,591 A | * | 6/2000 | Skoog | 379/230 |
| 6,094,479 A | * | 7/2000 | Lindeberg et al. | 379/220.01 |
| 6,130,933 A | * | 10/2000 | Miloslavsky | 379/90.01 |
| 6,246,678 B1 | * | 6/2001 | Erb et al. | 370/352 |
| 6,366,578 B1 | * | 4/2002 | Johnson | 370/353 |
| 6,445,776 B1 | * | 9/2002 | Shank et al. | 379/88.1 |

* cited by examiner

*Primary Examiner*—Bing Q. Bui
(74) *Attorney, Agent, or Firm*—Blakely, Sokoloff, Taylor & Zafman LLP

(57) ABSTRACT

An improved computer telephony (CT) server which utilizes a standard message structure to communicate with applications, but may interface such applications to a variety of different telephony environments by translating the standard message structure used by such applications into the specific message structure required by each such telephony environment. The aforementioned telephony environments may include PBXs, ACDs, packet telephony environments and public switched telephone networks. The desired telephony environment may be chosen by the application, or by the computer telephony server, some combination of both, or entirely automatically.

10 Claims, 2 Drawing Sheets

COMPUTER TELEPHONY SERVER WITH IMPROVED FLEXIBILITY

TECHNICAL FIELD

This invention relates to telephony, and more particularly, to an improved computer telephony server that is capable of easily and conveniently interfacing with a variety of computer telephony environments, on a dynamic basis if necessary.

BACKGROUND OF THE INVENTION

The industry of computer telephony has experienced extensive growth over the last several years. One aspect of computer telephony involves software computer telephony applications which communicate over a local area network (LAN) or computer bus with a computer telephony (CT) server. The CT server then communicates with a private automated branch exchange ("PABX" or "PBX") for the purpose of implementing certain computer telephony functions. For example, "screen pop" is an example of a computer telephony application which may run on a personal computer (PC) and which may be implemented using a computer telephony server. In such an arrangement, a caller who dials in to a call center would have his telephone number read by a PBX. The telephone number is then forwarded through a local area network to a CT application program, which utilizes a table look-up in order to map the telephone number to a particular account number and account information. The account information is then read from a database and placed upon a computer screen to make it available to an agent for handling the incoming telephone call.

U.S. Pat. No. 5,414,762 assigned to Q-sys describes a computer telephony server that can be implemented as a layer of software and assists with the interface between various PBXs and applications. Specifically, as described in the Q-sys patent, each of the variety of PBXs available on the market today may have differences in its command set, message structure and other features. Accordingly, it is highly desirable that applications developers who write CT applications be able to write such applications independent of the particular PBX being utilized. Otherwise, each time an application is to work with a different PBX, the application would have to be rewritten.

The foregoing Q-sys patent solves the problem by offering a CT server that is capable of communicating with a variety of PBXs available on the market. The Q-sys telephony server has a standard message structure for communicating with applications over a local area network or a computer bus. Additionally, the arrangement taught by the Q-sys patent provides a means for translating the messages received from CT applications into the particular language and message structure of the particular PBX being utilized by the system.

The arrangement of the Q-sys patent provides a solution to the problem that applications developers used to face, namely, that each time their application was connected to a different PBX, it would have to be rewritten in order to understand and interpret the particular message structure, protocol, etc., of the PBX. By utilizing the Q-sys technique, a common language can be used by all applications, and a layer of independence is achieved between the CT application and the PBX. Systems like that taught by the Q-sys patent were available nearly ten (10) years ago from Digital Equipment Corporation.

One problem with the Q-sys arrangement is that it does not take into account the fact that a PBX is only one particular type of telecommunications system capable of establishing a call between users. Specifically, the Q-sys system, while being capable of communicating with a variety of PBXs, is limited to situations where a PBX is the means by which arriving telephone calls are connected to users. In view of the foregoing, there exists a need in the art for an improved CT server which can operate in an environment where there are not only PBXs being utilized to establish calls between users, but rather, where a variety of telephony systems (packet telephony networks, public switched telephony networks, etc.) may be utilized alternatively or simultaneously to construct such cells.

SUMMARY OF THE INVENTION

The foregoing and other problems of the prior art are overcome in accordance with the present inventions which relates to a method and apparatus for interfacing from computer telephony applications to a variety of computer telephony environments. In accordance with the present invention, a computer telephony server is utilized which provides a standard language for communicating with the call control mechanisms of a plurality of diverse telecommunications environments (such as PBXs, automatic call distributor (ACD) systems, Internet telephony environments, public switched telephone networks, etc.), and translating service requests and call status information between the standard instruction set utilized by the CT applications and the specific instruction set required by each telephony environment.

The server may be configured to communicate by means of the language and message structure of any of such diverse telecommunications environments through configuration instructions issued by the CT application operating on a remote computer. Alternatively, manual configuration of the server via human intervention may be used.

DETAILED DESCRIPTION OF THE PREFERRED EMBODIMENT

Figure 1:
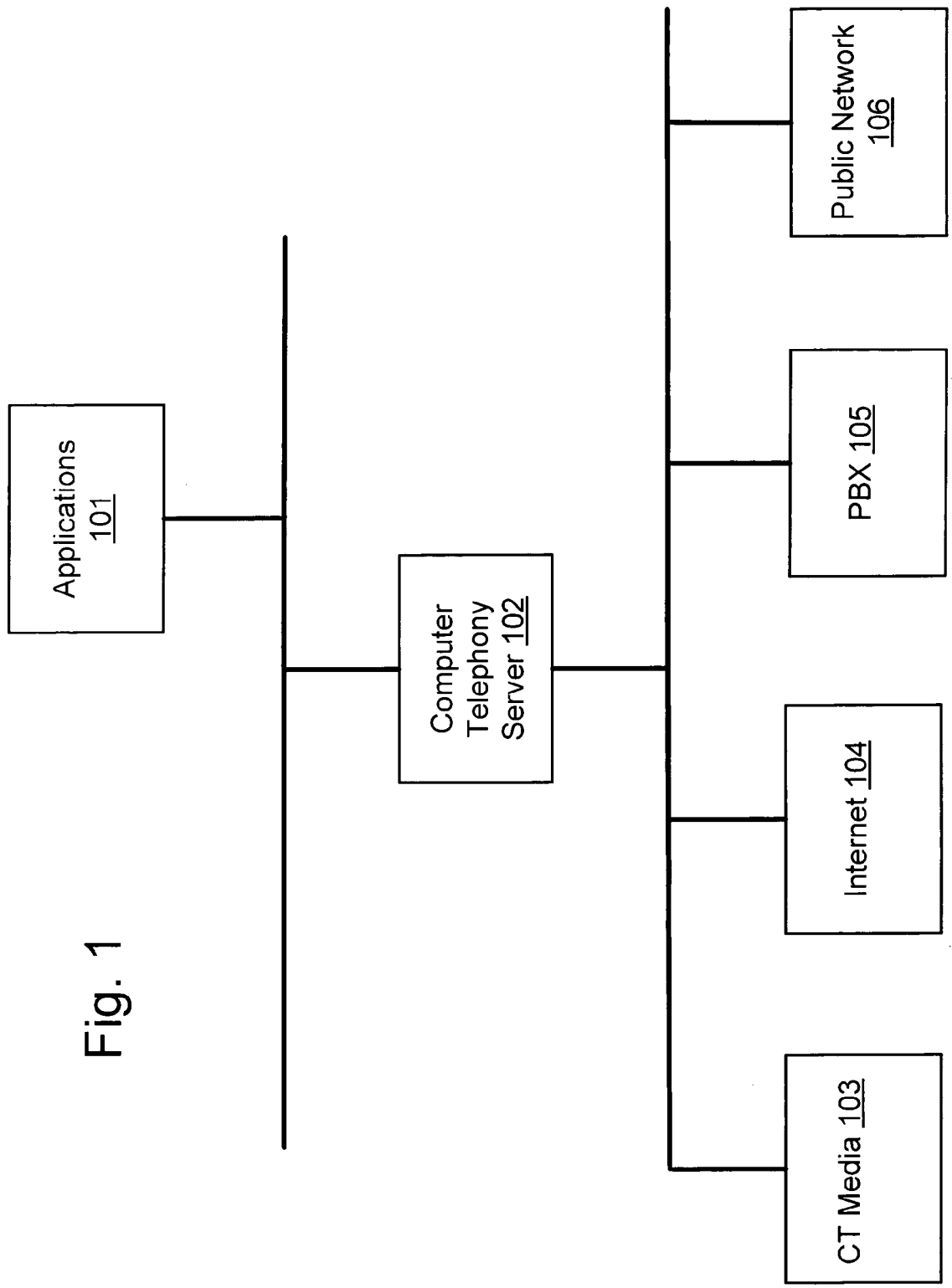
FIG. 1 shows an architectural diagram of the exemplary embodiment of the present invention as used in a multiple telephony environment system.

FIG. 1 shows an exemplary system in which the computer telephony server of the present invention may be used. The arrangement of FIG. 1 includes one or more applications 101, the inventive computer telephony server 102, and telephony environments 103 through 106. In the exemplary telephony environments shown, an Internet telephony environment 104 is included, as well as a PBX 105, the public switched telephone network (PSTN) 106, and an open switching system (103) built upon a CT media platform. The CT media platform is an open, general-purpose hardware and software platform suitable for the construction of media processing and switching systems. A representative CT media platform is available from the assignee of the present invention, and commercial implementations of switching systems built upon that platform are likewise available from their respective developers.

It is understood that the applications 101 may be any of a variety of computer telephony applications, such as screen pop applications, voice processing systems, etc. Other possible applications include call routing (determining to whom or to what system an incoming call should be routed) and database driven dialing, whereby an automated dialing application calls a predetermined set of telephone numbers listed in a database. Any one or more of these applications may require communications with CT server 102, as is conventional in the art.

In operation, information is exchanged between applications 101 and CT server 102, and between CT server 102 and one or more of the plurality of computer telephony environments 103 through 106. For purposes of explanation herein, and not limitation, the example of a screen pop application 101 is utilized. In such an application, a telephone call is received through one of the telephony environments and delivered to the telephone instrument associated with a user of the screen pop application. Simultaneously, information about the arriving call is sent by the telephony environment (in its specific instruction set) to the CT server, which in turn forwards the information to the CT application (in the application's selected standard instruction set). The application discovers the caller's identity according to the existing computer telephony art by inspecting the automatic number identification (ANI) information or other user-entered data such as an account number. The CT application 101 uses this information to retrieve appropriate records from a business application database and presents the information to the user to expedite further interactions with the caller.

The information exchanged between the telephony server and the application relates to instructions which the application requires the computer telephony server to execute, as well as to status messages which are returned from the computer telephony environment (e.g., PBX 105) to the application 101. The computer telephony server 102 is arranged to be configurable for communicating with any of the variety of computer telephony environments. Additionally, such configuration may be done when the system is initially installed, or may be done on a dynamic basis, perhaps through commands issued by a particular application.

For example, an application may be capable of establishing telephony calls between its associated user and a remote party via a PBX or via the public switched telephone network. The application specifies, as part of its initial communication with CT server 102, the particular telephony environment desired. Computer telephony server 102 then translates all appropriate messages between application 101 and the selected telephony environment, 103 through 106. Such messages are translated into appropriate commands and message structures which are applicable to either the PBX or the public network, as specified. The particular application may operate exactly the same regardless of whether the computer telephony environment is a PBX or a public network, or any of the other available environments. Additionally, if the application does not provide for such a selection, such a selection may be done automatically or in accordance with an operator program selection criteria and computer telephony server 102. Such an arrangement makes the application completely unaware of the commands and message structures of the particular telephony environment, and thus applications need not be rewritten each time the particular telephony environment is changed.

Figure 2:
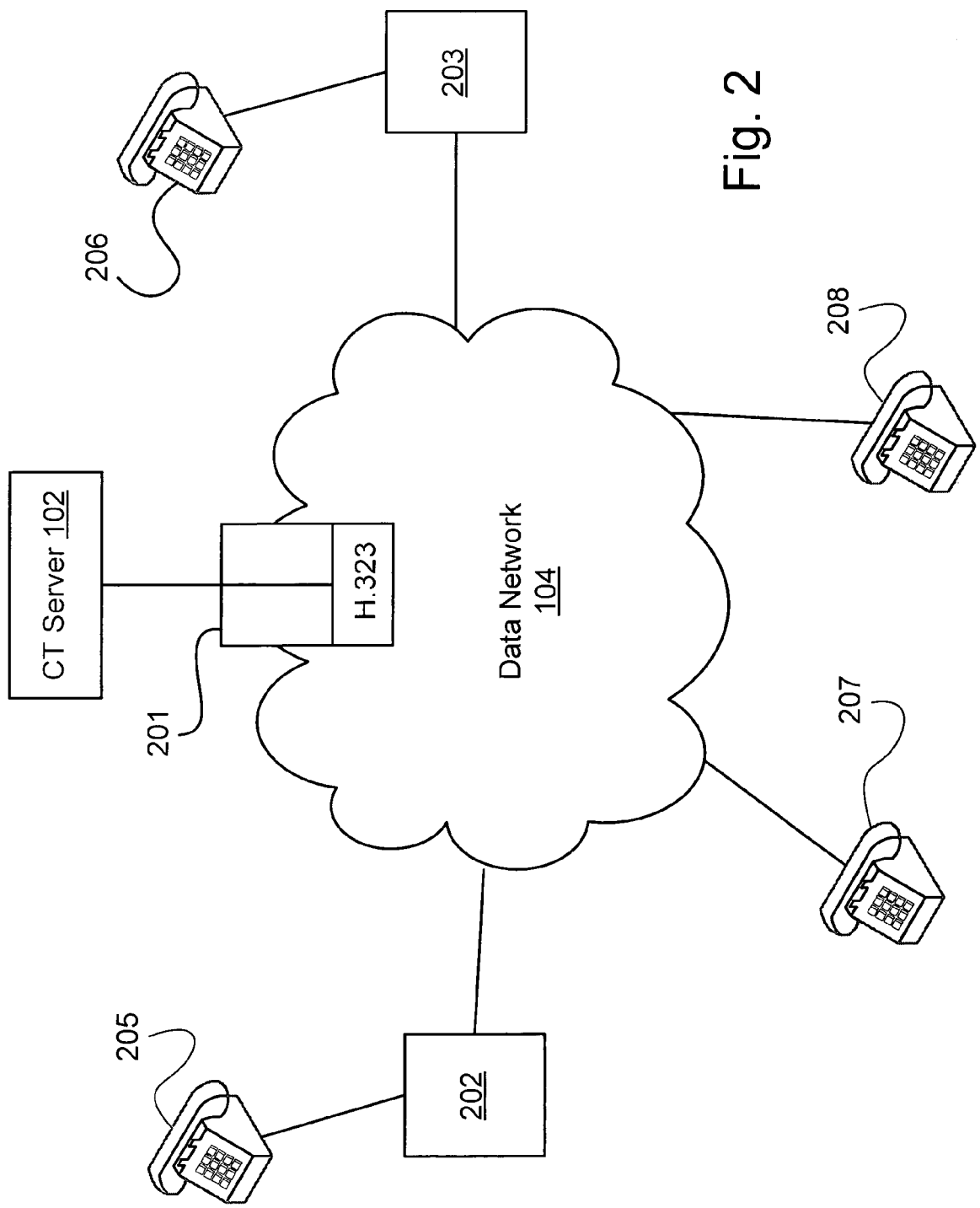
FIG. 2 shows an exemplary embodiment of a data network telephony environment with which computer telephony server 102 of FIG. 1 may work.

FIG. 2 shows a slightly more detailed diagram of the interconnection between the CT server 102 and a packet telephony network 104. As shown in FIG. 2, CT server 102 communicates with a gatekeeper 201 installed within the packet telephony network and configured according to the packet telephony art to supervise calls between the endpoints of interest to the CT application. The gatekeeper implements, for example, the H.323 protocols defined by the International Telecommunications Unit (ITU) for this purpose. Within the packet telephony environment, the gatekeeper 201 is responsible for supervising the establishment and disconnection of calls between endpoints within the packet telephony environment, such endpoints comprising both gateways 202 and 203 (points of entrance and egress from the packet telephony environment to other telephony environments such as the public switched telephone network) as well as telephone instruments 207 and 208 (connected directly to the packet telephony environment).

When so directed by one of the applications 101 (using the standard instruction set selected by the application), CT server 102 communicates over a data network with the gatekeeper 201 (using the specific instruction set required by gatekeeper 201) requesting gatekeeper 201 to establish, disconnect, or take some other action with respect to calls within the gatekeeper's domain of supervision. Gatekeeper 201, in turn, utilizes the H.323 instructions specified by the ITU to implement the required operations within the packet telephony environment such as establishing internet telephony calls among end user telephones 205 through 208.

Note that the use of Internet telephony and gatekeeper 201 is entirely transparent to applications 101 and whether such telephony environment is used or whether the connection is set up through a PBX CT media or public switched telephone network need not concern an application. Accordingly, the same application can be utilized together with a variety of telephony environments.

The above describes the preferred embodiment of the invention. It is understood that various modifications or additions will be apparent to those of skill in the art. Such additions are intended to be covered by the claims appended hereto.

The invention claimed is:

1. A call processing system comprising:
   a computer, including a receiver unit to receive an account number or other identifying information associated with a telephone caller's account, a table lookup unit to perform a table lookup to ascertain information regarding the telephone caller's account, a display unit to display such information on a computer screen, and a selecting unit to select one of a plurality of telephony environments to communicate over;
   a telephone device to receive a telephone call from one of the telephony environments while the information regarding the telephone caller's account is to be received by said computer;
   a local area network arranged to effectuate communications between said computer and other computer devices, said communications occurring utilizing a communications protocol and message set which is independent of any particular telephony environment; and
   a server, connected to the local area network and being configured to communicate with said computer using the communications protocol and message set which is independent of any particular telephony environment, said server also being dynamically configurable to communicate with a plurality of telephony environments utilizing protocols and message sets each corresponding to a particular one of said telephony environments, said server being automatically configurable to communicate using one of the protocols and message sets corresponding to the particular telephony environment selected based upon receipt of a selection message from said computer.

2. The system of claim 1 wherein said server is also capable of communicating with a plurality of different PBX's.

3. The system of claim 1 wherein said telephony environments comprises one or more of PBX, network servers for a packet telephony network, public switch telephone network switch.

4. A computer telephony server for interfacing a plurality of computer telephony applications programs to one of a plurality of telephony environments, said computer telephony server comprising:
 a configuration unit for dynamically configuring said server to communicate, using a message structure set which is independent of any particular telephony environment, with at least one computer telephony application;
 a translation layer for translating messages from the message structure set which is independent of any particular telephony environment to a message structure set corresponding to a particular one of said telephony environments;
 a first receiving unit for receiving a selection message from said telephony application indicating a selected telephony environment with which to communicate, wherein the configuration unit automatically configures said server to communicate using the message structure set of said selected environment upon receipt of the selection message; and
 a second receiving unit for receiving information associated with a telephone caller's account from the selected telephony environment while a corresponding telephone call is being received by a telephone device from the selected telephony environment.

5. The system of claim 4 wherein said telephony application is a call routing application.

6. The system of claim 4 wherein said telephony application is a database driven dialing application.

7. The telephony server of claim 4 herein said telephony environments comprises one or more of PBX, network servers for a packet telephony network, public switch telephone network switch.

8. A method of interfacing a plurality of telecommunications environments with a computer telephony server comprising:
 receiving messages from a telecommunications environment according to a message structure specific to the environment while a telephone device is receiving a telephone call corresponding to the messages from the telecommunications environment;
 translating the received messages according to a second message structure; and
 forwarding the translated messages to one of a plurality of computer telephony applications that operate according to the second message structure.

9. The method of claim 8 wherein the computer telephony application to which the translated messages are forwarded is a screen pop application.

10. The method of claim 8 wherein the telephony server is capable of selecting which of the plurality of telephony environments with which to communicate via a setup menu.

* * * * *